Patented Aug. 18, 1942

2,293,388

UNITED STATES PATENT OFFICE 2,293,388

POLYAMIDES AND THEIR PREPARATION

William E. Hanford, Wilmington, Del., assignor to E. I. du Pont de Nemours & Company, Wilmington, Del., a corporation of Delaware No Drawing. Application November 21, 1939, Serial No. 305,561

16 Claims. (Cl. 260—78)

This invention relates to polymeric materials and more particularly to the preparation of fiber-forming synthetic linear polyamides.

The polyamides with which this invention is concerned are related to those described in U. S. Patent 2,071,253. The polyamides of the patent are obtained by heating under polyamide-forming conditions a monoaminomonocarboxylic acid or an amide-forming derivative thereof. In order to insure the production of high molecular weight linear polyamides and to avoid excessive loss of reactant due to the formation of cyclic products, the amino acids and their derivatives previously selected, with a few exceptions, have a unit length of at least 7. The term "unit length" is defined as in the above mentioned patent as meaning the number of atoms in the structural unit of the amino acid or its derivative. In other words, it is the sum of the atoms in the chain separating the amino and carboxyl groups in the amino acid, plus the nitrogen atom of the amino group and the carbon atom of the carboxyl group.

This invention has as an object a method for preparing in good yield high molecular weight polyamides from reactants comprising in substantial amount monoaminomonocarboxylic acids or their derivatives which tend to yield cyclic or low molecular weight products by prior methods. A further object is a new method for preparing fiber-forming polyamides which is applicable generally to amino acid type reactants, including those having a unit length less than seven as well as those having a unit length of seven or more. Other objects will appear hereinafter.

These objects are accomplished by reacting the monoaminomonocarboxylic acid or its amide-forming derivative with at least a chemically equivalent amount of a bifunctional amide-forming reactant in which both amide-forming groups are complementary to one and the same amide-forming group of the amino acid type reactant, and then reacting the resulting product with a bifunctional amide-forming reactant in which both amide-forming groups are complementary to those of the first mentioned bifunctional reactant, the bifunctional amide-forming reactant in the second stage being used in amount substantially chemically equivalent to that used in the first stage.

In other words, the amino acid or its derivative may be reacted with a dicarboxylic acid and the product obtained reacted with a diamine in the above mentioned proportions, or the amino acid reactant may be reacted with a diamine and the product obtained reacted with a dicarboxylic acid. In either instance the dicarboxylic acid and diamine may be replaced by amide-forming derivatives thereof.

In practicing the invention it is usually more desirable to use an amide-forming derivative of the amino acid than the free acid itself. A particularly valuable method consists in reacting the amino acid ester with a substantially equimolecular amount of dicarboxylic acid at amide-forming temperatures. The intermediate thus formed, which functions as a dicarboxylic acid, is then heated at amide-forming temperatures with an amount of diamine substantially equimolecularly equivalent to the amount of dicarboxylic acid used in the first step. The temperatures used may range from 120° to 300° C., but are preferably from 120° to 200° C. in the first step and from 150° to 275° C. in the second step. This process is illustrated in subsequent Example I.

Another valuable method, illustrated in subsequent Example III, consists in heating the isocyanate ester, $OCNCH(R')-(CH_2)_x-CO_2R''$, where $R'$ is a monovalent hydrocarbon radical or hydrogen, $R''$ is a monovalent hydrocarbon radical, and $x$ is 0, 1, 2, or 3, with a dicarboxylic acid, $HOOC(CH_2)_yCOOH$ where $y$ is an integer, at 120–200° until substantially no more $CO_2$ is evolved. To this reaction product $R''OOC-(CH_2)_x-CHR'-NH-OC-$
$(CH_2)_y-CONH-CHR'-(CH_2)_xCO_2R$ is added an amount of diamine chemically equivalent to the amount of dicarboxylic acid added in the first step. This mixture is then heated in a sealed tube at 120–200° C. for several hours, the tube is opened, and the reaction mixture is heated at about 175–275° C., preferably under reduced pressure, until the resulting polymer has acquired fiber-forming properties. The temperature and time of reaction of both the steps of this invention will vary somewhat depending upon the reactants used. In general the polymerization is carried out at a temperature above the melting point of the polymer.

A further method for carrying out this invention consists of treating the aminoester hydrochloride, $HCl-NH_2CH(R')-(CH_2)_x-CO_2R''$, with a dicarboxylic acid chloride $ClOC(CH_2)_yCOCl$ and alkali in a Schotten-Baumann type reaction to produce the intermediate diamide-diester $R''O_2C(CH_2)_xCH(R')NHCO(CH_2)_y$
$CONHCH(R_1)(CH_2)_xCO_2R''$ where $R'$, $R''$ and $x$ are defined as above and $y$ is an integer, preferably at least 3. This material is isolated, purified, mixed with a chemical equivalent of diamine and heated under amidating conditions to give a polyamide. This method is illustrated in Example IV.

The following examples in which quantities of reagents are given as parts by weight illustrate in greater detail the processes of this invention.

Example I

A mixture of 14.5 parts of methyl leucinate and 20.2 parts of sebacic acid were mixed, sealed in vacuo, and heated for 2 hours at 175° C. The container was opened, 17.2 parts of decamethylenediamine was added, the container was sealed in vacuo, and heated at 150° C. for 3 hours. The polymerization was finished by opening the container and heating the reaction mixture at 150° C. in an atmosphere of nitrogen for 3 hours, and then at 218° C. under reduced pressure for 2 hours. This produced 40 parts of a light colored polymer having an intrinsic viscosity of 0.49 and a softening point of 90.5° C. The product could be formed into useful filaments and films.

Example II

A mixture of 5.5 parts of the isocyanate of ethyl leucinate, $(CH_3)_2CHCH_2CH(OCN)CO_2C_2H_5$, and 13.32 parts of sebacic acid was placed in an open tube and heated at 140° C. for 45 minutes. By this time the vigorous evolution of gas had almost ceased. To the tube was then added 11.35 parts of decamethylenediamine, the tube flushed with nitrogen several times, and sealed under a vaccum. The tube was heated at 150° C. for about an hour, opened, and heated in a nitrogen atmosphere at from 150° to 170° C. for another hour. The tube was then connected to the vacuum pump and the temperature gradually raised to 230° C. over a period of four hours. There was thus produced 25.3 parts of the light colored, hard polymer which could be spun into filaments that were susceptible to cold-drawing. This material softened at 125–130° C., had an intrinsic viscosity of 0.4, and was soluble in cresol and in concentrated hydrochloric acid.

The isocyanate of ethyl leucinate used above was prepared as follows:

To a solution of 110 parts of dry hydrogen chloride in one liter of absolute alcohol was added 131 parts (1 mol) of leucine,

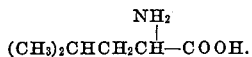
$(CH_3)_2CHCH_2CH(NH_2)-COOH$.

The mixture was refluxed 45 minutes, filtered, and the alcohol removed under reduced pressure on the steam bath. To the dry powdery residue was added 520 parts of dry toluene. The powdery material on heating and stirring went into solution and 120 parts of toluene was then distilled until the distillate had become clear. While stirring and keeping the reaction mixture at the boiling point of toluene, phosgene was passed in for about two hours until the evolution of the hydrogen chloride had almost ceased. After filtration, the toluene was removed and the residue distilled giving 132 parts of the isocyanate of ethyl leucinate boiling at 80–87° C. at 2–4 mm. $N^{25}_D = 1.4277$. Calc'd for $C_9H_{15}O_3N$: N, 7.57, Found: N, 7.29. Neut. Equiv. Calc'd: 185, Found: Neut. Equiv. 193,195,192.

Example III

By a technique similar to that used in Example II, a polymer was made from 5.55 parts of the isocyanate of ethyl leucinate, 2.335 parts of adipic acid, and 1.855 parts of hexamethylenediamine. The first stage of the reaction was carried out at 140° for one hour. After adding the diamine the mixture was heated in a sealed tube at 150° for 2.5 hours. The tube was then evacuated and the temperature raised gradually from 155° C. to 220° C. during an hour. Heating two hours more at this temperature gave a light yellow polymer which could be spun into filaments.

Example IV

To a solution of 200 parts of water containing 39 parts of the hydrochloric of ethyl leucinate cooled to 5° C. was added slowly 8 parts of sodium hydroxide in 100 parts of water. Then with stirring and cooling 11.9 parts of sebacyl chloride was slowly introduced. At this point the vessel was equipped with two inlets and another similar portion of sebacyl chloride and of alkali admitted simultaneously. By this time considerable waxy solid had separated from the reaction mixture. The mixture was extracted first with 450 parts and then with 100 parts of ether, and washed in turn with cold dilute hydrochloric acid, cold dilute sodium bicarbonate, and cold water, and then dried with sodium sulfate. Evaporation of the ether gave 17 parts of a clear oil. This oil is the diamide-diester of structure

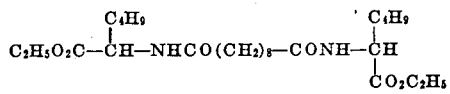

Calc'd for $C_{26}H_{48}O_6N_2$: N, 5.78. Found: N, 5.48.

In a reaction tube were mixed 2.56 parts of the diamide-diester and 0.91 part of decamethylenediamine. The tube was flushed with nitrogen and sealed in vacuo. The tube was heated at 120–130° C. for 3.5 hours. It was then opened, connected to a vacuum, and heated to 200° C. during an hour. It was then heated at 220–230° C. for 3.5 hours. This produced 2.5 parts of a light colored fiber-forming polymer.

The present invention is operable with amino acids of high as well as of low unit length but since there are better methods, from the standpoint of cost, applicable to acids of unit length of seven or more, the present invention is desirably confined to the amino acids of unit length below 7 inasmuch as it is this class with which difficulty is experienced in the prior practice. Further examples of suitable amino acids include the following and their amide-forming derivatives: glycine, c-dimethyl glycine, alanine, gamma-aminobutyric acid, delta-aminovaleric acid, alpha-dimethyl-beta-aminopropionic acid, alpha-aminocaproic acid, alpha-aminomyristic acid, and beta-phenyl-alpha-aminopropionic acid.

It is to be understood that the order of reacting the dicarboxylic acid or derivative and diamine is not vital and the claims are not, therefore, intended to be limited to a specific order. Instead of first treating the amino acid reactant with a dibasic acid as in the examples, this procedure may be reversed by first reacting the amino acid reactant with a diamine. The intermediate thus formed is then treated with a chemically equivalent amount of a dibasic acid.

The best results are obtained in the practice of the present process by using dibasic acids having a radical length of at least 5 and diamines having a radical length of at least 4, where "radical length" is defined as in U. S. Patent 2,130,948. The radical of a dibasic carboxylic acid, as therein defined, is that fragment or divalent radical remaining after the two acidic hydroxyls have been removed, and the radical of a diamine, as also defined therein, is that fragment or divalent radical remaining after one hydrogen has been removed from each of the amino groups.

The term "radical length," in the case of both the acids and the diamines, refers merely to the number of atoms in the chains of the aforesaid radicals.

It will be noted that in Examples I and II the molecular proportions of the amino acid constituents (leucinate) employed in the first step did not exceed those of the initial dicarboxylic acids, with which they respectively were reacted, and that the resulting intermediate dicarboxylic acids which were formed in the said first step contained only a single amide link—the structure of the said intermediate dicarboxylic acids being as follows:

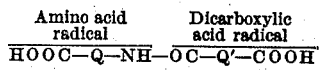
HOOC—Q—NH—OC—Q'—COOH

It will be noted further that in Examples III and IV, on the other hand, the corresponding molecular proportions of the amino acid constituents (leucinate) were twice those of the initial dicarboxylic acids, with the result that the intermediate dicarboxylic acids formed in the first steps in these Examples each contained two, rather than merely one, amide links—the structure of the said intermediate dicarboxylic acids being as follows:

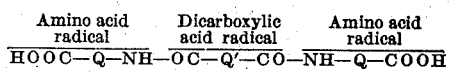
HOOC—Q—NH—OC—Q'—CO—NH—Q—COOH

Thus, when dicarboxylic acid is employed as the first reactant with the amino acid, the resulting intermediate dicarboxylic acid (which is reacted with diamine in the second step of the process of the invention) consists of a molecule carrying two terminal carboxyl groups and containing, in the chain connecting them, either one or two amide links, depending on whether one or both of the terminal carboxyl groups of the initial dibasic acid have been amidated by the amino acid. In either case, however, the formation of the final linear polymer as a result of reacting the intermediate dicarboxylic acid with a diamine results from the amidation of the carboxyl groups of the said intermediate acid with amino groups of the diamine employed in the second step of the process of the invention.

If diamine, rather than dicarboxylic acid, be reacted with the amino acid constituent in the carrying out of the first step, there likewise results an intermediate diamine which will contain either one, or two, amide links, depending on whether equimolecular or twice equimolecular proportions of the amino acid are reacted with the initial diamine. Thus, if equimolecular proportions of the amino acid constituent and the initial diamine are employed the resulting intermediate diamine has the following structure:

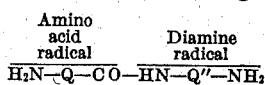
H₂N—Q—CO—HN—Q''—NH₂

On the other hand, if two mols of the amino acid constituent are reacted with one mol of diamine in carrying out the first step, the resulting intermediate diamine contains two amide links—the structure of the said intermediate diamine being as follows:

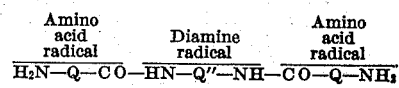
H₂N—Q—CO—HN—Q''—NH—CO—Q—NH₂

It will be apparent, therefore, that when diamine is employed as the first reactant with the amino acid, the resulting intermediate diamine (which in such case is reacted with dicarboxylic acid in the second step of the process of the invention) consists of a molecule carrying two terminal amino groups and containing, in the chain connecting them, either one or two amide links, depending on whether one or both of the terminal amino groups of the initial diamine have been amidated by the amino acid. In either case, however, the formation of the final linear polymer, as a result of reacting the intermediate diamine with a dicarboxylic acid, results from the amidation of the amino groups of the said intermediate diamine with carboxyl groups of the dicarboxylic acid employed in the second step of the process of the invention.

The foregoing explanation will serve to emphasize the fact that four different categories of final polymers to be obtained in the practice of the invention may be designated according to their respective characteristic recurring units, as follows:

I. Where equimolecular proportions of amino acid constituent and dicarboxylic acid constituent are reacted in the first step—the resulting dicarboxylic acid being reacted with diamine in the second step:

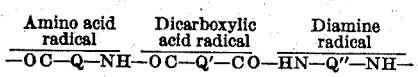
—OC—Q—NH—OC—Q'—CO—HN—Q''—NH—

II. Where equimolecular proportions of amino acid constituent and diamine constituent are reacted in the first step—the resulting diamine being reacted with dicarboxylic acid in the second step:

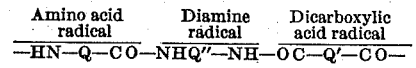
—HN—Q—CO—NHQ''—NH—OC—Q'—CO—

III. Where 2 molecular proportions of amino acid are reacted with 1 molecular proportion of dicarboxylic acid constituent in the first step—the resulting dicarboxylic acid being reacted with diamine in the second step:

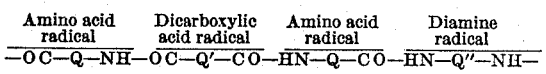
—OC—Q—NH—OC—Q'—CO—HN—Q—CO—HN—Q''—NH—

IV. Where 2 molecular proportions of amino acid constituent are reacted with 1 molecular proportion of diamine constituent in the first step—the resulting diamine being reacted with dicarboxylic acid in the second step.

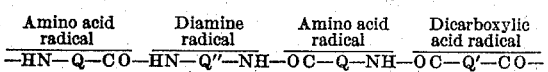
—HN—Q—CO—HN—Q''—NH—OC—Q—NH—OC—Q'—CO—

In the foregoing formulas Q preferably is $(CH_2)_x$, Q' preferably is $(CH_2)_y$, and Q'' preferably is $(CH_2)_z$, $x$, $y$, and $z$ being integers, $x$ preferably though not necessarily being at least three, and $z$ preferably though not necessarily being at least two.

It may be observed that when an alpha amino acid is employed, as in each of Examples I–IV, $x$ is one. In this instance, that portion of the amino acid chain beginning with the beta carbon, if any, is to be regarded as a lateral substituent on the alpha carbon to which the amino group is attached; i. e., one of the hydrogens in the $(CH_2)_x$ is replaced by a lateral substituent. In the case of leucine (whose esters or other derivatives are employed in each of the said examples), this lateral substituent is— $CH_2CH(CH_3)_2$.

Dibasic acids of this type in addition to those given in the examples are adipic acid, 3-methyl adipic acid, suberic acid, azelaic acid, and diphenic acid. As additional examples of useful diamines may be mentioned ethylenediamine, tetramethylenediamine, hexamethylenediamine, 3-methyl hexamethylenediamine, 2,5-dimethyl hexamethylenediamine, octamethylenediamine, gamma, gamma'-diaminodipropyl ether, N,N'-dimethyl hexamethylenediamine and m-phenylenediamine. These reactants may, however, be replaced in some instances by those of lower radical length, as for instance by dibasic acids or their amide-forming derivatives such as diethyl malonate.

It is in some cases desirable to purify the intermediate formed from the reaction of the amino acid and the bifunctional amide-forming reactant with which it is first reacted. In cases where this intermediate product is the diamide-diester, as in Example IV, it is possible to hydrolyze this by means of alkali at room temperature to the corresponding diamide-diacid before reaction with diamines. The first reaction which occurs when a diamine and a dicarboxylic acid are mixed thoroughly is the formation of a salt. The preparation of the salt affords an automatic means for adjusting the amine and acid reactants to a substantial equivalency and tends to eliminate impurities present in the original diamine and dicarboxylic acid. As a rule the diamine-dicarboxylic acid salts are soluble in water and may be recrystallized from certain alcohols or alcohol-water mixtures. The preparation of the fiber-forming polyamides from the diamine-dibasic acid salts can be carried out by any one of the several ways described in U. S. Patent 2,130,948.

After the amino acid has been treated with the first amide-forming reactant to give the desired intermediate, it is possible to substitute for a part or for all of the second amide-forming reactant other polymer-forming reactants, which are capable of reacting with the reactive groups in the intermediate. Thus, if the intermediate has terminal carboxyl groups, a glycol may be substituted for the whole or part of the diamine normally used in the second step. The second step can also be effected in the presence of such polymer-forming compositions as hydroxy acids and polymerizable amino acids.

Although polyamides, compared to most organic compounds, are fairly resistant to oxidation, the high temperatures required for their preparation cause discoloration in the presence of air, and for this reason it is desirable to carry out the reaction in the presence of an inert gas such as nitrogen. It is also important to exclude oxygen from the polymer during spinning from melt.

In general, no added catalysts are required in the above process of this invention. However, certain materials such as inorganic materials of alkaline reaction such as oxides, carbonates, or acidic materials such as halogen salts of polyvalent metals, e. g., stannous chloride, certain neutral salts, e. g., magnesium sulfate and silica, appear in many cases to exercise a certain degree of catalytic activity. Another important class of compounds capable of exerting catalytic functions are strong acids of which phosphoric, sulfuric, borophosphoric, and p-toluenesulfonic acids are examples.

For certain purposes it is desirable that polymers be viscosity-stable, i. e., do not appreciably alter in viscosity (molecular weight) when heated at their melting point. Viscosity-stable polyamides can be prepared by using a small excess (up to 5 molar per cent) of the diamine or dicarboxylic acid reagent, or by incorporating in the reaction mixture a small amount, generally 0.1 to 5 molar per cent of a monoamine or a monocarboxylic acid or amide-forming derivative thereof. Acetic acid, 2-ethyl hexylamine, an ethyl butyrate are examples of viscosity stabilizers.

Continuous filaments may be made in a number of ways. The polymer may be formed into filaments by extruding the molten polymer through orifices into an atmosphere where it congeals into filaments. The polymer may also be dissolved in a suitable solvent and a solution extruded through orifices into a coagulating bath and the resulting filaments continuously collected on a suitable revolving drum, or by extruding a solution into a heated chamber where the solvent is removed by evaporation.

The preferred embodiment comprises heating the reactants until they exhibit fiber-forming properties, that is are capable of being formed into fibers. It is, however, within the scope of this invention to discontinue heating before this stage is reached, since the low molecular weight or non-fiber-forming polymers are useful for certain applications, e. g. in coating and molding compositions.

Products of this invention can be used for the preparation of fibers for use in the textile art; for example, for the preparation of knitted, woven, and pile fabrics, the fibers can also be used for the preparation of yarns, threads, ropes, cords, and many special cloths. Other uses for fibers in suitable form include artificial hair, bristles and ribbons. Sheet material prepared from polyamides of this invention find uses in certain applications, particularly after having been cold-rolled. Typical uses are wrapping foils, safety glass interlayers, leather substitute, gaskets, washers, lamp shades, bottle caps, belting, playing cards, and fiber-board substitutes. By proper choice of reactants, it is possible to prepare products possessing good solubility which make them useful as ingredients for coating and impregnating compositions; for example, the polymers can be used to coat paper, cloth, leather, bookbinding, and other materials from melt or from solution. The polymers can be used as clear lacquers and in the form of pigmented enamels as paints. Rubber may also be coated with polyamides to decrease the sensitivity to aromatic hydrocarbons. The polymers can also be used in molding.

It is understood that in all of the above uses the products of this invention may be mixed with other materials, such as plasticizers, resins, pigments, dyes, cellulose derivatives, simple polyamides, polyamide-esters, and polyesters.

This invention makes possible the production of linear polyamides from amino acids or their derivatives which have a unit length less than 7 and which constitute a class to which the previous methods of forming useful polyamides from amino acids are not generally applicable due to the tendency of amino acids of this radical length to form cyclic monomers and dimers. Since certain amino acids of radical length less than 7 are readily available compounds, the commercial advantage in polyamide manufacture of utilizing these compounds in substantial amount will be apparent.

The polyamides of this invention are relatively chemically inert solids whose solubility characteristics and softening point depend upon the reactants from which they are derived. In general the products are microcrystalline and have fairly sharp melting points. They are soluble in phenols and in formic acid. They are characterized by high strength. These properties render the products of this invention particularly suitable for the uses previously mentioned.

As many apparently widely different embodiments of this invention may be made without departing from the spirit and scope thereof, it is to be understood that I do not limit myself to the specific embodiments thereof except as defined in the appended claims.

I claim:

1. A process for making polyamides which comprises reacting a substance of the class consisting of monoaminomonocarboxylic acids containing only two reacting groups and their bifunctional carbonamide-forming derivatives with at least a chemically equivalent amount of a bifunctional carbonamide-forming reactant containing only two reacting groups which both are carbonamide-forming groups complementary to one and the same carbonamide-forming group in said substance, and thereafter heating at reacting temperatures the resulting product with a bifunctional carbonamide-forming reactant containing only two reacting groups which both are carbonamide-forming groups complementary to those of said first mentioned bifunctional carbonamide-forming reactant, said bifunctional reactants being used in substantially chemically equivalent amounts.

2. A process for making fiber-forming polyamides which comprises heating at reacting temperatures a substance of the class consisting of cyclic carbonamide-forming monoaminomonocarboxylic acids containing only two reacting groups and their bifunctional carbonamide-forming derivatives with at least a chemically equivalent amount of a bifunctional carbonamide-forming reactant containinly only two reacting groups which both are carbonamide-forming groups identical and complementary to one of the carbonamide-forming groups in said substance, and thereafter heating at reacting temperatures the resulting product with a bifunctional carbonamide-forming reactant containing only two reacting groups which both are carbonamide-forming groups identical and complementary to those of said first-mentioned bifunctional carbonamide-forming reactant, said bifunctional reactants being used in substantially chemically equivalent amounts, and continuing said heating until the polyamide obtained is capable of being formed into pliable fibers.

3. A process for making fiber-forming polyamides which comprises heating at reacting temperatures a bifunctional carbonamide-forming derivative of a monoaminomonocarboxylic acid containing only two reacting groups and having a unit length less than seven with at least a chemically equivalent amount of a bifunctional carbonamide-forming reactant containing only two reacting groups which both are carbonamide-forming groups identical and complementary to one of the carbonamide-forming groups in the monoaminomonocarboxylic acid derivative, and thereafter heating at reacting temperatures the resulting product with a bifunctional carbonamide-forming reactant containing only two reacting groups which both are carbonamide-forming groups identical and complementary to those of said first mentioned bifunctional carbonamide-forming reactant, said bifunctional reactants being used in substantially chemically equivalent amounts, and continuing said heating until the polyamide obtained is capable of being formed into pliable fibers.

4. A process for making polyamides which comprises reacting a monoaminomonocarboxylic acid ester containing only two reacting groups with at least a chemically equivalent amount of a dicarboxylic acid containing only two reacting groups, and thereafter heating at reacting temperatures the resulting product with a diamine containing only two reacting groups in amount substantially equimolecularly equivalent to the amount of said dicarboxylic acid.

5. A process for making polyamides which comprises heating at reacting temperatures an isocyanate ester containing only two reacting groups with at least a chemically equivalent amount of a dicarboxylic acid containing only two reacting groups and thereafter heating at reacting temperatures the resulting product with a diamine containing only two reacting groups in amount substantially chemically equivalent to that of said discarboxylic acid.

6. A process for making fiber-forming polyamides which comprises heating at reacting temperatures an isocyanate ester containing only two reacting groups with at least a chemically equivalent amount of a dicarboxylic acid containing only two reacting groups and thereafter heating at reacting temperatures the resulting product with a diamine containing only two reacting groups in amount substantially chemically equivalent to that of said dicarboxylic acid, and continuing said heating until the polyamide obtained is capable of being formed into pliable fibers.

7. A process for making polyamides which comprises reacting in the presence of alkali the hydrochloride of an ester of a monoaminomonocarboxylic acid containing only two reacting groups with a dicarboxylic acid chloride containing only two reacting groups and heating at reacting temperatures the resulting product with a diamine containing only two reacting groups.

8. A process for making fiber-forming polyamides which comprises reacting in the presence of alkali a substantially chemically equivalent amount of the hydrochloride of an ester of a monoaminomonocarboxylic acid containing only two reacting groups with a dicarboxylic acid chloride containing only two reacting groups, heating at reacting temperatures the resulting product with a substantially chemically equivalent amount of a diamine containing only two reacting groups, and continuing said heating until the polyamide obtained is capable of being formed into pliable fibers.

9. A linear polyamide having recurring structural units of the general formula

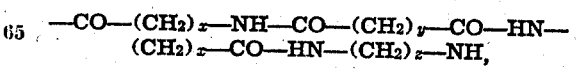
$$-CO-(CH_2)_x-NH-CO-(CH_2)_y-CO-HN-(CH_2)_z-CO-HN-(CH_2)_z-NH,$$

in which $x$, $y$, and $z$ are integers and $x$ is less than five.

10. The linear polyamide set forth in claim 9 in which $y$ is at least three and $z$ is at least two.

11. The polyamide set forth in claim 9 in which $y$ is at least three, $z$ is at least two, $x$ is one, and one of the hydrogens in the group $(CH_2)_x$ is substituted by a hydrocarbon radical.

12. The polyamide set forth in claim 9 in which $y$ is at least three, $z$ is at least two, $x$ is one, and one of the hydrogens in the group $(CH_2)_x$ is substituted by the radical—$CH_2CH(CH_3)_2$.

13. A monoaminomonocarboxylic acid-diamine-dibasic carboxylic acid interpolymer in which the monoaminomonocarboxylic acids, diamines, and dibasic carboxylic acids represented are bifunctional and contain two amide-forming groups as the sole reacting groups and in which the number of amino acid radicals is substantially equal to the sum of the numbers of the diamine and the dibasic carboxylic acid radicals, and the recurrence, in the interpolymer chain, of the monoaminomonocarboxylic acid, diamine, and dibasic carboxylic acid radicals is predominantly in the sequence: monoaminomonocarboxylic acid-dibasic carboxylic acid-monoaminomonocarboxylic acid-diamine.

14. The process for making polyamides which comprises heating, under polymerizing conditions, a diamine containing only two reacting groups with a dicarboxylic acid containing only two reacting groups, at least one of which reactants contains at least one antecedently formed carbonamide link in the chain separating its terminal functional groups.

15. A linear polymer formed by condensation reaction between a diamine containing only two reacting groups and a dicarboxylic acid containing only two reacting groups, the said linear polymer containing a number of antecedent carbonamide links in its chain, which number is at least approximately equal to the number of carbonamide links caused by the said condensation reaction.

16. A linear polyamide having recurring structural units of the general formula

—OC—Q—NH—OC—Q'—CO—NH—Q''—NH— wherein Q, Q' and Q'' are divalent hydrocarbon radicals.

WILLIAM E. HANFORD.